(No Model.)
A. D. JEFFREY.
MOLD.
No. 511,893.　　　　　　　　Patented Jan. 2, 1894.
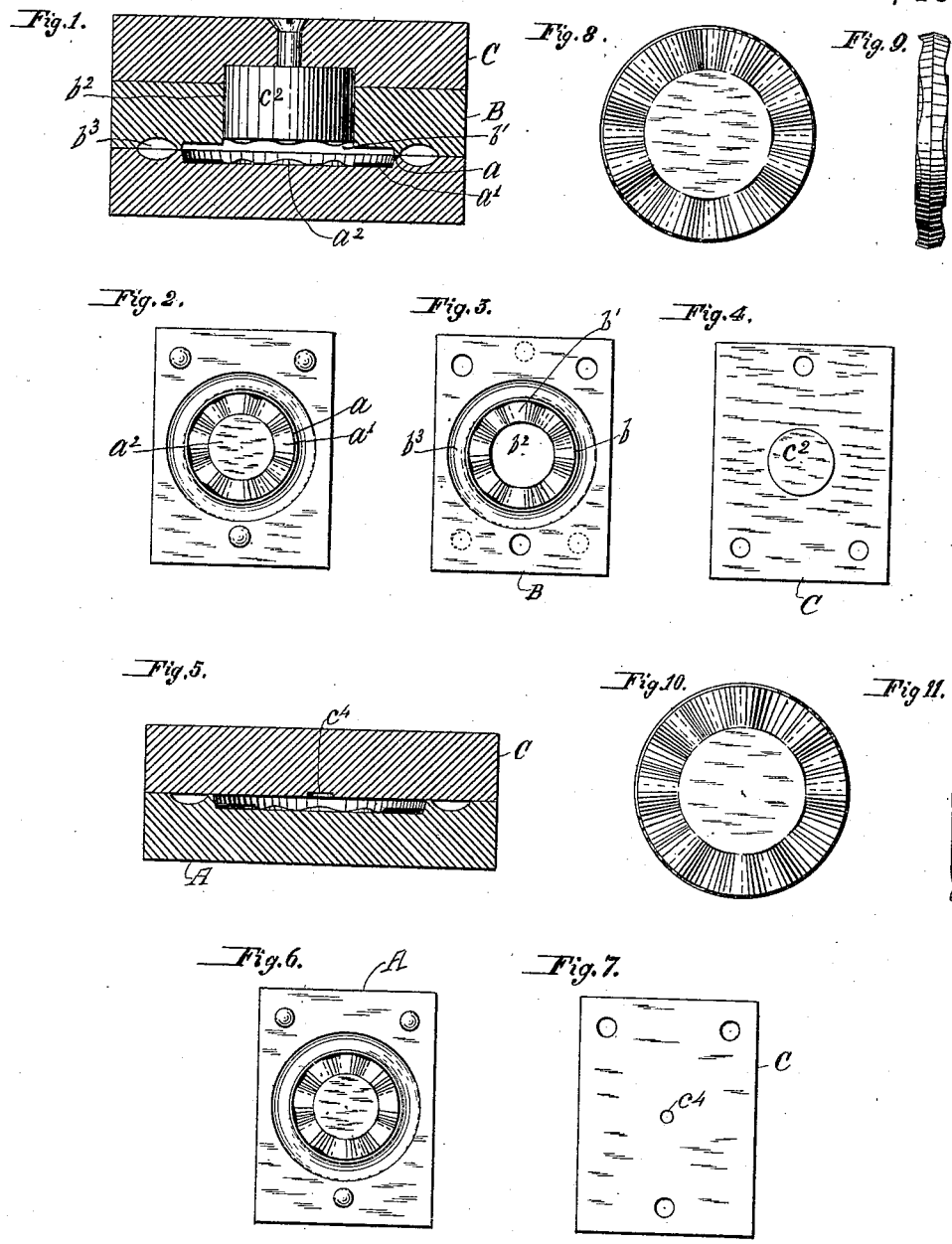
WITNESSES:
William M. Iliff
Walter Smith
INVENTOR
Albert D. Jeffrey
BY Edwin H. Brown
his ATTORNEY

UNITED STATES PATENT OFFICE.

ALBERT D. JEFFREY, OF BROOKLYN, ASSIGNOR TO HIRAM W. HARRIS, OF NEW YORK, N. Y.

MOLD.

SPECIFICATION forming part of Letters Patent No. 511,893, dated January 2, 1894.

Application filed February 23, 1893. Serial No. 463,308. (No model.)

*To all whom it may concern:*

Be it known that I, ALBERT D. JEFFREY, of Brooklyn, Kings county, and State of New York, have invented a certain new and useful Improvement in Molds, of which the following is a specification.

I will describe a mold embodying my improvement and then point out the novel features in the claims.

In the accompanying drawings, Figure 1 is a transverse section of a mold embodying my improvement. Fig. 2 is a plan view of the bottom plate. Fig. 3 is an inverted plan view of the middle plate. Fig. 4 is an inverted plan view of the top plate. Fig. 5 is a transverse section of a mold of modified form. Fig. 6 is a plan view of the bottom plate of this mold. Fig. 7 in an inverted plan view of the top plate of this mold. Fig. 8 is a top view of a game counter such as is made by the mold illustrated by Figs. 1 to 4 inclusive. Fig. 9 is an edge view of such counter. Fig. 10 is a top view of a counter such as is made by the mold illustrated by Figs. 5 to 7 inclusive. Fig. 11 is an edge view of this counter.

Similar letters of reference designate corresponding parts in all the figures.

I will describe the mold illustrated by Figs. 1 to 4 inclusive. It is of the form suitable for making disk-shaped game counters of plastic material. The bottom plate has a rim $a$ for bounding or defining the edge of the counter. Inward of this, it has an annular surface $a'$, which is depressed relatively to the rim $a$ and is corrugated, the corrugations being extended radially. Inward of this corrugated annular portion $a'$ is a circular portion $a^2$. This mold is especially intended for pressing disks of contrasting material into the material of which the counter is mainly formed. Such disks are usually made very thin and sometimes have openings cut through them to expose the material of which the counters are mainly formed. These disks are intended to be of the size of the central circular portion $a^2$ in the bottom plate of the mold, so that one can be inserted therein and held in place. Outside of the rim $a$ is an annular waste cavity or groove for surplus material.

B designates the middle plate of the mold. It is precisely like the bottom plate, excepting that instead of having a central circular portion $a^2$, it has a cylindric hole at the same point. In this middle plate, $b$ designates a rim for bounding or defining the edge of a counter, $b'$ designates a radially corrugated annular portion and $b^3$ designates an annular waste cavity surrounding the rim $b$. The central hole is designated $b^2$.

C designates the top plate of the mold. On its under side, it is entirely flat, excepting that it is provided with a cylindric boss $c^2$, capable of fitting within the central cylindric hole $b^2$ of the middle plate B.

In molding a counter or other article in such a mold, the disk of contrasting material is inserted in the central circular portion $a^2$ of the bottom plate and the plastic material is introduced. Afterward the middle plate is superposed. Next another disk is inserted through the central opening $b^2$ of the middle plate and finally the top plate is applied, so that its boss will enter the circular opening of the middle plate. Suitable pressure is then applied, the plastic material being in a heated state.

In Figs. 8 and 9, I have illustrated such a counter as is intended to be made by this mold.

Turning to the example of my improvement represented in Figs. 5 to 7 inclusive, it will be sufficient to say that the bottom plate, A, is precisely like the bottom plate of the mold first described, and the top plate C is flat on the under side, excepting only that it has a central circular hole or cavity $c^4$. It is intended when this mold is used to mold one disk-shaped half of a counter and subsequently to unite two such halves to form a complete counter. One of the halves will have a cavity in its back and the other a boss which may be pressed into the cavity to form a rivet, and unite the two halves together. A half counter of this kind is illustrated in Figs. 10 and 11.

It will be seen that counters coming from these molds will have wavy or corrugated outer surfaces near the circumference. It is intended that ultimately these will be pressed out flat in another mold. The object of the corrugated or wavy surfaces is to allow the air to escape at all points during the final molding, wherein the flattening out and finishing are done. Heretofore it has been customary to provide quite deep and sharply defined radial grooves for air vents and in the final pressing of the counters, it has not always been possible to smooth out these grooves so as to entirely obliterate them. Indeed, much waste occurs from this cause in the manufacture of such counters. I obviate all this trouble by the corrugated or wavy surface.

I desire it to be expressly understood that I do not confine myself to a corrugated or wavy surface entirely around a mold or counter. One or more of the wide or extended projections may suffice. Furthermore, I do not limit myself to a strictly radial arrangement of the waves or corrugations.

What I claim as my invention, and desire to secure by Letters Patent, is—

1. In a mold, the combination of a plate having a molding cavity provided with a waved marginal portion, substantially as specified.

2. In a mold, the combination of a plate having a molding cavity with a marginal portion which has radial corrugations, substantially as specified.

In testimony whereof I have signed my name to this specification in the presence of two subscribing witnesses.

ALBERT D. JEFFREY.

Witnesses:
ANTHONY GREF,
WM. A. POLLOCK.